United States Patent Office 3,281,379
Patented Oct. 25, 1966

3,281,379
PROCESS FOR MAKING POLYURETHANE FOAM
Lucien Robert Fontaine, Arthur John Pastor, and Robert Andrew Newton, Lake Jackson, Tex., assignors to The Dow Chemical Company, Midland, Mich., a corporation of Delaware
No Drawing. Filed Nov. 7, 1963, Ser. No. 322,047
7 Claims. (Cl. 260—2.5)

This invention concerns a process for making polyurethane foams. It relates more particularly to an improved process for making polyurethane foams by using additives to produce at least part of the cells or porosity in the foam.

It is known to produce polyurethane foams by incorporating with the urethane foaming ingredients an easily liquidified or readily vaporized volatile organic fluid boiling below about 100° C. such as a halogen-substituted lower aliphatic hydrocarbon, preferably containing at least one fluorine atom in the molecule, e.g. trichloromonofluoromethane, as the foaming or blowing agent.

In the making of polyurethane foams employing volatile low boiling additives that are readily vaporized under the exothermic polyurethane-forming reaction of the ingredients, it has been observed that interior portions of the foamed material or bun reach elevated temperatures which may result in deterioration or scorching of the product, and which temperatures tend to be maintained in interior sections of the foam because of the good insulating characteristics of the cellular mass which render it difficult to readily or rapidly remove heat from the interior of the bun. Such elevated temperatures when maintained for prolonged periods of time result in deterioration of the properties of the foam product or more often inhibit the formation of foam having good mechanical properties, i.e. the foam is often, particularly in its interior sections because of being heated at the high exothermic temperatures for prolonged periods of time, possessed of properties such as tensile strength and/or elongation values that are lower than are desired.

In addition to the low mechanical properties the foam is often discolored an undesirable yellow or yellowish color which renders it less desired for many purposes.

Accordingly, it is a primary object of the invention to provide a method for making polyurethane foam which avoids the aforementioned difficulties.

It is another object to provide a method for making polyurethane foams using halogenated low boiling hydrocarbon additives and certain stabilizing agents as hereinafter defined, as blowing agents to produce the cells and/or porosity in the foam.

A further object is to provide a method and blowing agents for making polyurethane foam which inhibits or substantially prevents discoloring of the foam upon prolonged exposure to elevated temperatures. Other and related objects may appear from the following description of the invention.

According to the invention, polyurethane foams free or substantially free from discoloring resulting from the prolonged heating of interior portions of the foam mass at elevated temperatures can readily be prepared by incorporating with the volatile chlorinated lower alkane blowing agent, e.g. methylene chloride or chloroform, a small but effective amount of an epoxide compound such as an alkylene oxide or an epoxy resin or a glycidyl ether of an aliphatic compound, within the range of from about 0.01 to 5 percent by weight of the volatile chlorinated aliphatic hydrocarbon, e.g. methylene chloride, used.

The epoxide compound to be employed in the process can be a relatively volatile epoxide such as an alkylene oxide containing from two to four carbon atoms, e.g. ethylene oxide, propylene oxide, butylene oxide, isobutylene oxide, or a higher boiling epoxy compound such as styrene oxide, amylene oxide or other higher alkylene oxides having 4 to 18 carbon atmos or glycidyl compounds such as butyl glycidyl ether or an epoxy resin such as diglycidyl ether of p,p'-isopropylidenediphenol or an epoxy novolac resin. Mixtures of any two or more of such epoxides can be used, but the alkylene oxides containing 2–18 carbon atoms are preferred.

A volatile chlorinated aliphatic hydrocarbon such as chloroform or methylene chloride containing from 0.01 to 5 percent by weight of one or more of the aforementioned epoxide compounds can be used as the blowing agent in the preparation of flexible polyurethane foam.

Among polyether polyols that can be employed to make polyurethane foams using the chlorinated additive blowing agents and the epoxide compound are the reaction products of glycol, glycerol, trimethylol propane, pentaerythritol, 1,2,6-hexane triol, phloroglucinol, trimethylol benzene, trimethylol phenol, sucrose, or sorbitol, reacted with an alkylene oxide such as ethylene oxide, propylene oxide, butylene oxide or mixtures of such alkylene oxides, or by the successive reaction of two or more of such alkylene oxides which polyether polyols have an OH equivalent weight of 500 or greater. The polyether polyols have at least two but may have up to eight functional hydroxy radicals.

The isocyanates employed are polyisocyanates having two, three or more reactive isocyanate groups (NCO). Examples of suitable polyisocyanates are hexamethylene diisocyanate, tolylene 2,4- or tolylene 2,6-diisocyanate, diphenyl methane diisocyanate, p,p-metaphenylene diisocyanate, p-phenylene diisocyanate, naththalene diisocyanate, dimethyl diphenyl methane diisocyanate and mixtures thereof. Another useful isocyanate is "Papi-1" having the general formula

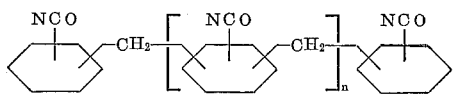

wherein $n$ has an average value of about 1.

In making the polyurethanes or foamed material one method consists in pumping the ingredients separately or as a mixture of two or more ingredients through a metering device into a mixing chamber wherein the ingredients are rapidly and uniformly blended with one another in the desired proportions and the blended mixture is discharged into an open mold which can be a trough and is allowed to foam and cure at ambient temperatures and atmospheric pressure.

The following examples illustrate ways in which the principle of the invention has been applied, but is not to be construed as limiting its scope.

*Example 1*

A charge of 100 parts by weight of a polyol consisting of the adduct of 1,2-propylene oxide with glycerine to form a triol having an average OH equivalent weight of about 1150 and a hydroxyl number of about 47 was mixed with 0.1 part by weight of propylene oxide and 3 parts by weight of methylene chloride.

A mixture of 4 parts by weight of water 0.1 part by weight of triethylene-diamine and 1.2 parts of a silicone oil consisting of an alkyl silane polyoxyalkylene block copolymer of the formula

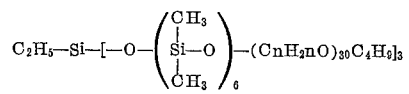

wherein CnH2nO is a mixed polyoxyethylene and oxypropylene block copolymer containing about 17 oxyethylene units and about 13 oxypropylene units, was blended into a uniform composition.

The above mixtures were separately metered, as was tolylene diisocyanate and stannous octoate, to a Hennecke UBT 63 foam machine, wherein the four streams of ingredients were blended with one another in a mixing chamber at a temperature of about 75° F.

| Ingredient: | parts by weight |
|---|---|
| Polyol | 100 |
| Methylene chloride | 3 |
| Propylene oxide | 0.1 |
| Tolylene diisocyanate | 48.4 |
| Silicone oil | 1.2 |
| Triethylenediamine | 0.1 |
| Water | 4.0 |
| Stannous octoate | 0.35 |

The resulting mixture was discharged in continuous manner from the mixing chamber into an open mold 8 feet wide by 4 feet long by 16 inches deep wherein the material was allowed to foam to a bun of substantially the same dimensions as the mold. Thermocouples were inserted in the foam bun and the temperature therein observed. In a typical test the center of the foam bun reaches a maximum temperature of about 160° C. within 15 minutes after the start of the foaming reaction, then starts cooling, but in the absence of forced cooling the enterior of the bun or foam remains at a temperature above about 100° C. for a period of 6 to 10 hours. In the experiment just described the results were as follows:

| Test No. | Time, Mins. | Temperature, °C. |
|---|---|---|
| 1 | 0 | 35 |
| 2 | 5 | 145 |
| 3 | 10 | 155 |
| 4 | 15 | 156 |
| 5 | 30 | 156 |
| 6 | 45 | 155 |
| 7 | 60 | 154 |
| 8 | 90 | 150 |
| 9 | 120 | 144 |
| 10 | 150 | 140 |
| 11 | 180 | 136 |
| 12 | 210 | 132 |
| 13 | 240 | 129 |
| 14 | 270 | 126 |
| 15 | 300 | 122 |
| 16 | 330 | 120 |
| 17 | 360 | 117 |
| 18 | 420 | 112 |
| 19 | 480 | 106 |

The foamed bun was allowed to stand at room temperature and atmospheric pressure for a period of 24 hours. Thereafter, the foam bun was cut open and test pieces were cut from the center section. These test pieces were found to be of small substantially uniform cells and the foam was substantially free from yellow color.

In contrast, a foam prepared in similar manner, but without the propylene oxide, shows pronounced yellowing of the foam, particularly in the interior sections where the exothermic heat of reaction is retained for prolonged periods of time.

*Example 2*

A polyurethane foam was prepared by procedure and recipe as described in Example 1, except that 0.01 part by weight of propylene oxide, based on the weight of the polyol, was used instead of the 0.1 part used in Example 1. The interior sections of the foam bun had a light yellow color, but were substantially less colored than foam prepared in similar manner using methylene chloride as the blowing agent and no propylene oxide.

*Example 3*

A polyurethane foam was prepared by procedure and recipe as described in Example 1, except using 0.03 parts by weight of diglycidyl ether of p,p'-isopropylidenediphenol in place of the propylene oxide used in said example. The foamed polyurethane bun was substantially free from yellow color.

Similar results in the making of polyurethane foams that are free or substantially free from yellow discoloring, are obtained when from 0.01 to 5 parts by weight of ethylene oxide, butylene oxide, styrene oxide, or butyl glycidyl ether are employed in admixture with 100 parts by weight of methylene chloride as the blowing or foaming agent, in place of the epoxide compounds used in the examples.

We claim:
1. A method of making a polyurethane foam which comprises reacting a polyol having an OH equivalent weight of at least 500, with an organic polyisocyanate in the presence of from about 2 to about 40 percent by weight based on the total weight of said polyurethane foaming materials of a volatile chlorinated lower alkane having a boiling point below about 80° C. and above −20° C. and from 0.01 to 5 percent by weight based on the weight of said chlorinated alkane of an epoxy compound selected from the group consisting of alkylene oxides having from 2 to 18 carbon atoms, butyl glycidyl ether and diglycidyl ether of p,p'-isopropylidenediphenol.

2. A method as claimed in claim 1 wherein the epoxy compound is an alkylene oxide having from 2 to 18 carbon atoms.

3. A method as claimed in claim 1 wherein the epoxy compound is a butyl glycidyl ether.

4. A method as claimed in claim 1 wherein the epoxy compound is diglycidyl ether of p,p'-ispropylidenediphenol.

5. A method as claimed in claim 1 wherein the chlorinated alkane is methylene chloride.

6. A method of making a polyurethane foam which comprises reacting an essentially hydroxyl terminated polyether polyol having an OH equivalent weight of at least 500 with an organic polyisocyanate in the presence of from about 2 to about 40 percent by weight based on the weight of said polyether polyol, of methylene chloride and from 0.01 to 5 percent by weight based on the weight of the methylene chloride of an alkylene oxide having from 2 to 18 carbon atoms.

7. A method as claimed in claim 6 wherein the alkylene oxide is propylene oxide.

References Cited by the Examiner
UNITED STATES PATENTS

| 2,863,855 | 12/1958 | Wilson et al. | 260—2.5 |
| 2,935,537 | 5/1960 | Daras | 260—652.5 |
| 3,120,567 | 2/1964 | Dial | 260—652.5 |
| 3,148,167 | 9/1964 | Keplinger | 260—45.8 |
| 3,204,013 | 8/1965 | Osborn | 260—45.8 |

LEON J. BERCOVITZ, *Primary Examiner.*

D. E. CZAJA, *Assistant Examiner.*